J. M. B. LEWIS.
ANIMAL STANCHION.
APPLICATION FILED DEC. 9, 1918.
1,337,925.
Patented Apr. 20, 1920.
3 SHEETS—SHEET 3.
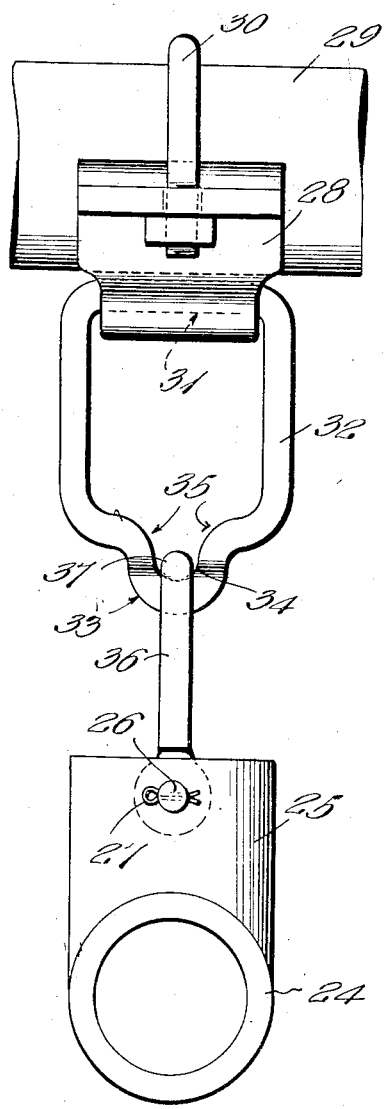
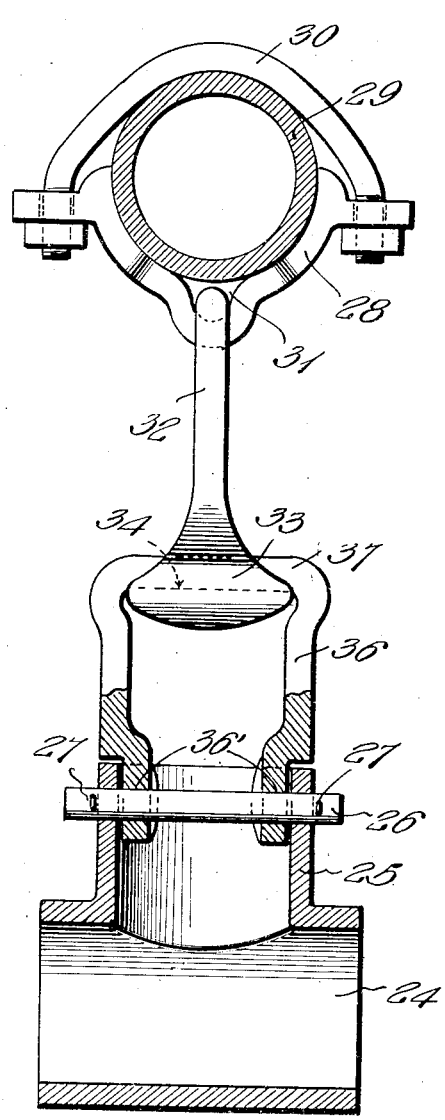
Inventor
John M. B. Lewis
By C. W. Parker
Attorney

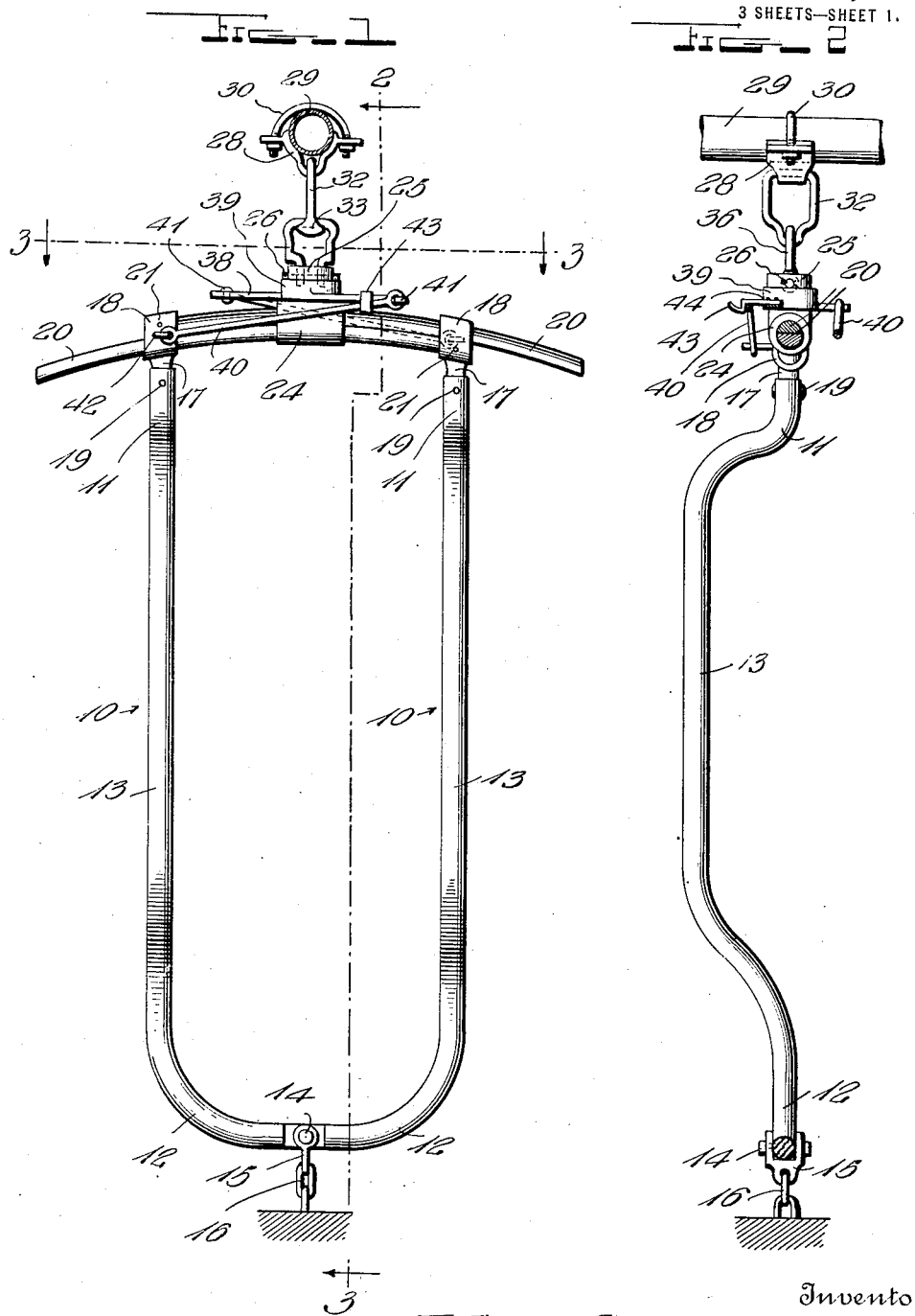

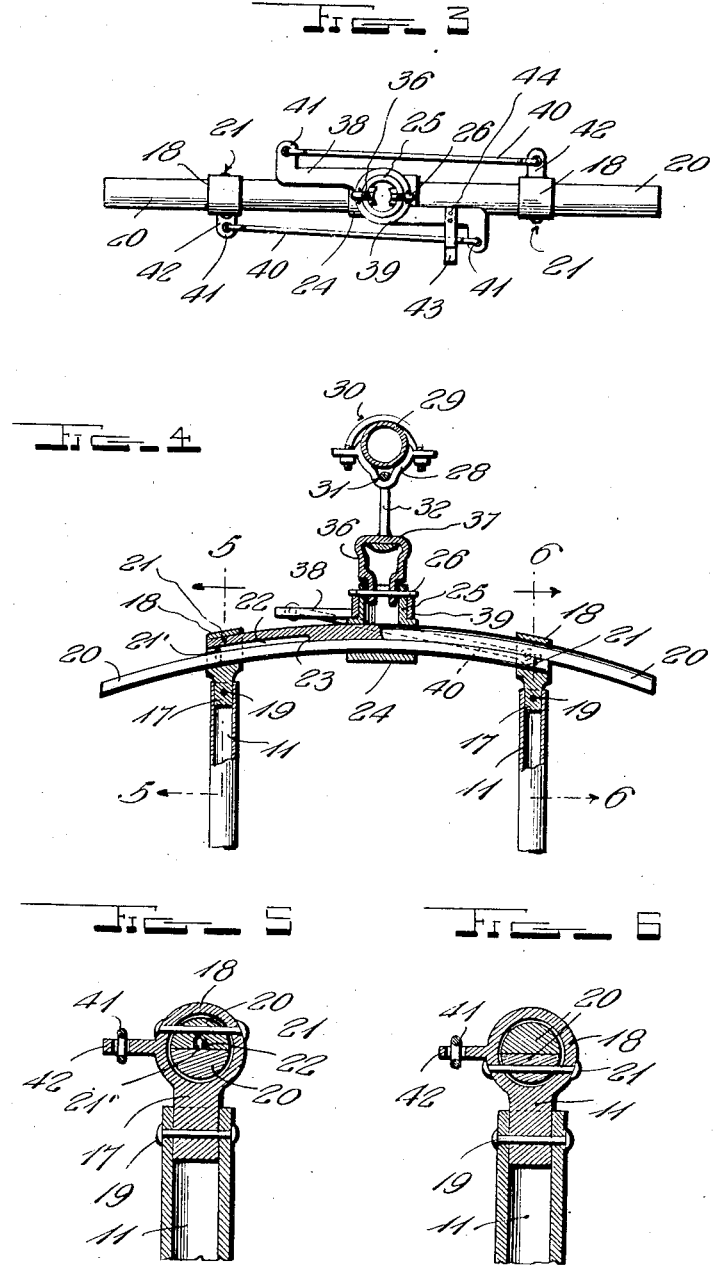

UNITED STATES PATENT OFFICE.

JOHN MINOR BOTTS LEWIS, OF LYNCHBURG, VIRGINIA, ASSIGNOR TO COWMATIC CORPORATION, OF LYNCHBURG, VIRGINIA, A CORPORATION OF VIRGINIA.

ANIMAL-STANCHION.

1,337,925.  Specification of Letters Patent.  Patented Apr. 20, 1920.

Application filed December 9, 1918. Serial No. 265,885.

*To all whom it may concern:*

Be it known that I, JOHN M. B. LEWIS, a citizen of the United States, residing at Lynchburg, in the county of Campbell and State of Virginia, have invented certain new and useful Improvements in Animal-Stanchions, of which the following is a specification.

My invention relates to improvements in animal stanchions.

An important object of the invention is to provide an animal stanchion embodying upstanding arms having laterally offset portions, with means for moving both arms to the opened and closed positions.

A further object of the invention is to provide an animal stanchion of the above mentioned character, which is simple in construction, strong, and durable.

Other objects and advantages of the invention will be apparent during the course of the following description.

In the accompanying drawings forming a part of this specification and in which like numerals are employed to designate like parts throughout the same, Figure 1 is a side elevation of an animal stanchion embodying my invention, Fig. 2 is a vertical sectional view taken on line 2—2 of Fig. 1, Fig. 3 is a horizontal sectional view taken on line 3—3 of Fig. 1, Fig. 4 is a central vertical longitudinal section through the upper ends of the arms of the stanchion and associated elements, Fig. 5 is a detailed section taken on line 5—5 of Fig. 4, Fig. 6 is a similar view taken on line 6—6 of Fig. 4, Fig. 7 is a side elevation of the flexible suspension device, and, Fig. 8 is a similar view, at a right angle to Fig. 7, parts being shown in section.

In the drawings, wherein for the purpose of illustration is shown a preferred embodiment of my invention, the numeral 10 designates a pair of upstanding arms, including upper and lower portions 11 and 12, and laterally offset portions 13. The laterally offset portions 13 are arranged rearwardly of the lower portions 12, and cause the cow to move rearwardly when standing, while the lower portions 12 cause her to move forwardly, when lying down.

At their lower ends, the portions 12 of the arms 10 are pivotally connected by means of a bolt 14 or the like, preferably passing through the sides of a yoke 15, having connection with a flexible anchor element 16, which may be a chain or other suitable means. This chain is secured to the floor or bottom of the stall, as is well known.

At their upper ends, the upper portions 11 of the arms 10, these arms being tubular, receive shanks 17 of guide sockets 18, to which they are rigidly secured. The shanks 17 are rigidly held within the upper ends of the portions 11 by means of pins or rivets 19, as shown. The numeral 20 designates longitudinally curved guide bars, having corresponding ends rigidly held within the guide sockets 18, as shown at 21. The longitudinally curved guide bars 20 are semi-circular in cross-section and are arranged in superposed relation, as shown. The free end of one guide bar is slidably mounted within the guide socket 18, fixed to the end of the other guide bar. These longitudinally curved guide bars are concentric with the pivot 14.

The lower guide bar 20 is provided upon its upper surface with a stop lug 21', operating within a longitudinal groove 22, formed in the lower side of the upper guide bar 20, such stop lug contacting with the shoulder 23 to limit the outward movements of the arms 10.

Slidably receiving the guide bars 20 is a horizontal sleeve 24, having an upstanding tube 25 rigidly secured thereto. The tube 25 is apertured near its upper end for receiving a horizontal pin 26, preferably held in place by cotter pins 27 or the like. The pin 26 preferably projects outwardly beyond the tube 25.

I provide a flexible suspension element, for the stanchion, comprising a lower yoke 28, held upon a support 29, extending above and longitudinally of the stall, by means of a U-bolt 30 adapted for longitudinal adjustment along the support 29. The yoke 28 is provided in its lower portion with a groove 31, pivotally receiving the upper end of a link 32, so that this link will be free to swing laterally of the stall but cannot partake of perceptible turning movements upon its vertical axis. At its lower end, the link 32 has enlarged cam portions 33, providing a groove 34 and inclined surfaces 35. The groove 34 is arranged at a right angle to the groove 31. A lower link 36 has its upper transverse end 37 arranged within the groove 34, while the lower ends of the link 36 project into the tube 25, and are apertured at 36', to pivotally receive the pin 26. The link 36 is thus adapted to swing longitudinally of the stall, and its transverse portion normally remains within the groove 34. When the stanchion is turned upon its longitudinal axis, the transverse portion of the link will ride upon the inclined cam faces 35, and when the stanchion is released these cam faces and groove 34 will coact with the link 36 to return the stanchion to the normal transverse position.

A horizontally swinging lever 38 is provided at a central point with an apertured head 39, pivoted upon the tube 25, the ends of the pin 26 projecting over the same to hold it in place. At its ends, the lever 36 has pivotal connection with links 40, as shown at 41. Ears 42 are rigidly secured to the guide sockets 18 and have pivotal connection with the links 40.

The lever 38 has a spring catch or latch 43, secured thereto, near one end thereof, as shown at 44. This latch is adapted to engage over one of the links 35, thereby serving to lock the arms 10 in the closed position.

In operation, when it is desired to open the arms 10, the latch 43 is moved upwardly to disengage the link 40. The arms 10 may now be simultaneously swung to the open position. The cow may be driven in the stall with her head within and between the open arms 10. The operator by taking hold of the arms 10 may simultaneously swing them to the closed position, the latch 43 automatically engaging over the link 40, thereby locking the arms 10 in the closed position.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In an animal stanchion of the character described, a pair of spaced arms pivotally connected near their lower ends so that the arms are adapted to be swung toward and away from each other, longitudinally curved guide bars secured to the upper ends of the arms and disposed in concentric relation to the pivot at the lower ends of the arms, said guide bars extending transversely of the stanchion in superposed contacting relation, one guide bar being provided with a longitudinal groove having a stop shoulder and the other guide bar having a pin to operate within the groove, a supporting sleeve receiving the guide bars, means connecting the arms so that they move together in opposite directions, means to lock the arms in the closed position, and anchor means connected with the lower ends of the arms.

2. In an animal stanchion of the character described, a pair of spaced arms having their lower ends pivotally connected so that the arms are adapted to be swung toward and away from each other transversely of the stall, said arms having lower portions to cause the cow to move forwardly while reclining and horizontally offset portions arranged above the lower portions and disposed for a substantial distance rearwardly of the lower portions and adapted to cause the cow to move rearwardly while standing, transverse longitudinally curved guide bars secured to the upper ends of the arms and arranged in concentric relation to the pivot of said arms, a suspension element having a sleeve slidably receiving the bars, a lever pivoted between its ends upon the suspension element, links connecting the ends of the lever with the arms, means to lock the lever in a closed position, comprising a spring latch secured to said lever adjacent one end thereof and adapted to engage one of said links when the lever is in closed position, and anchor means connected with the lower ends of the arms.

3. In an animal stanchion of the character described a pair of spaced arms having their lower ends pivotally connected so that the arms are adapted to be swung toward and away from each other, transverse longitudinally curved guide bars secured to the upper ends of the arms and arranged in concentric relation to the pivot of the arms, said guide bars being disposed in overlapping contacting relation, means to limit the outward longitudinal movements of the guide bars, a suspension element having a sleeve slidably receiving the guide bars, a lever pivoted between its ends upon the suspension element, links connecting the ends of the lever with the arms, a latch carried by the lever and adapted to engage with one link and serving to hold the lever in the closed position, and anchor means connected with the lower ends of the arms.

4. In an animal stanchion of the character described, a pair of spaced arms pivotally connected at corresponding ends, a sleeve secured to the upper end of each of said arms and transverse guide bar secured to each of said sleeves and slidably mounted within the sleeve mounted upon the other arm, one guide bar having a longitudinal groove provided with a stop shoulder and the other guide bar carrying an element to operate within the groove to limit the movement of the arms in one direction, and a suitably supported sleeve slidably receiving the guide bars.

5. In an animal stanchion of the character described, a pair of spaced arms connected at their lower ends, a substantially horizontal sleeve arranged near the upper ends of the arms and carrying a pivoted suspension element, guide bars secured to the upper ends of the arms and formed substantially semi-circular in cross section with their flat faces slidably contacting, one face having a groove formed therein with a stop shoulder and the other face carrying an element to operate within the groove, the assembled guide bars being circular in cross section and pivotally mounted within the sleeve, and a lever pivotally mounted upon the pivoted suspension element and having links connecting its ends with the arms, and a spring latch mounted on said lever and adapted to engage one of the links when the lever is in closed position.

In testimony whereof I affix my signature in presence of two witnesses.

JOHN MINOR BOTTS LEWIS.

Witnesses:
J. W. ARTHUR,
PETER AINSLIE.